United States Patent [19]

Woolfson

[11] Patent Number: 4,694,494
[45] Date of Patent: Sep. 15, 1987

[54] ELECTRONIC MEMORY DEVICES FOR THE BLIND

[75] Inventor: Louis A. Woolfson, Bartestree, England

[73] Assignee: Pathway Communications Limited, Hereford, England

[21] Appl. No.: 610,565

[22] Filed: May 15, 1984

[30] Foreign Application Priority Data

Jun. 7, 1983 [GB] United Kingdom ................. 8315630

[51] Int. Cl.⁴ .............................................. G10L 5/00
[52] U.S. Cl. ..................................................... 381/51
[58] Field of Search .................... 381/51, 52; 179/107; 340/825.19; 364/189, 419, 188, 709, 710, 146; 400/712, 61-63, 86, 87; 434/112-117, 230

[56] References Cited

FOREIGN PATENT DOCUMENTS

| 3240386 | 5/1984 | Fed. Rep. of Germany | 400/86 |
| 0185178 | 11/1982 | Japan | 400/712 |
| 0221441 | 12/1983 | Japan | 381/51 |
| 0139442 | 8/1984 | Japan | 340/825.19 |

OTHER PUBLICATIONS

Aitchison and Brown, "A Talking Typewriter for the Visually Handicapped", Journal of Electrical and Electronics Engineering, Australia, IEAust. & IREEAust, vol. 1, No. 4, Dec. 1981, pp. 288-292.

Foster et al., "Audio Review of Text", IBM Technical Disclosure Bulletin, vol. 23, No. 1, Jun. 1980.
Head et al., "Audio Device for the Blind", IBM Technical Disclosure Bulletin, vol. 21, No. 9, 1979.
Golding and Heneghan, "Audio Response Terminal", IBM Technical Disclosure Bulletin, vol. 26, No. 10B, Mar. 1984
Lundberg, "Word-Processing Station w/Audio Text Readout", IBM Technical Disclosure Bulletin, vol. 26, No. 6, Nov. 1983.
Flanagan, J. L., Speech Analysis, Synthesis, and Perception, Springer-Verlag, New York, 1972, pp. 15-17.

Primary Examiner—Gareth D. Shaw
Assistant Examiner—John G. Mills
Attorney, Agent, or Firm—Young & Thompson

[57] ABSTRACT

The device basically comprises a Braille keyboard, a memory for storing text entered on the keyboard, a text editor and a speech synthesizer. Braille coded information entered by the user by means of the keyboard is stored in the memory. The stored text may be subsequently converted to sighted language coded information by a translator and played back through the speech synthesizer to enable the user to interactively edit the stored text by means of the text editor in response to the speech output. The edited text may be outputted in sighted language form to a printer or in Braille form to an embosser to obtain a hard copy, or alternatively can be supplied to a cassette unit for long-term storage. The device is compact and simple to use.

12 Claims, 1 Drawing Figure

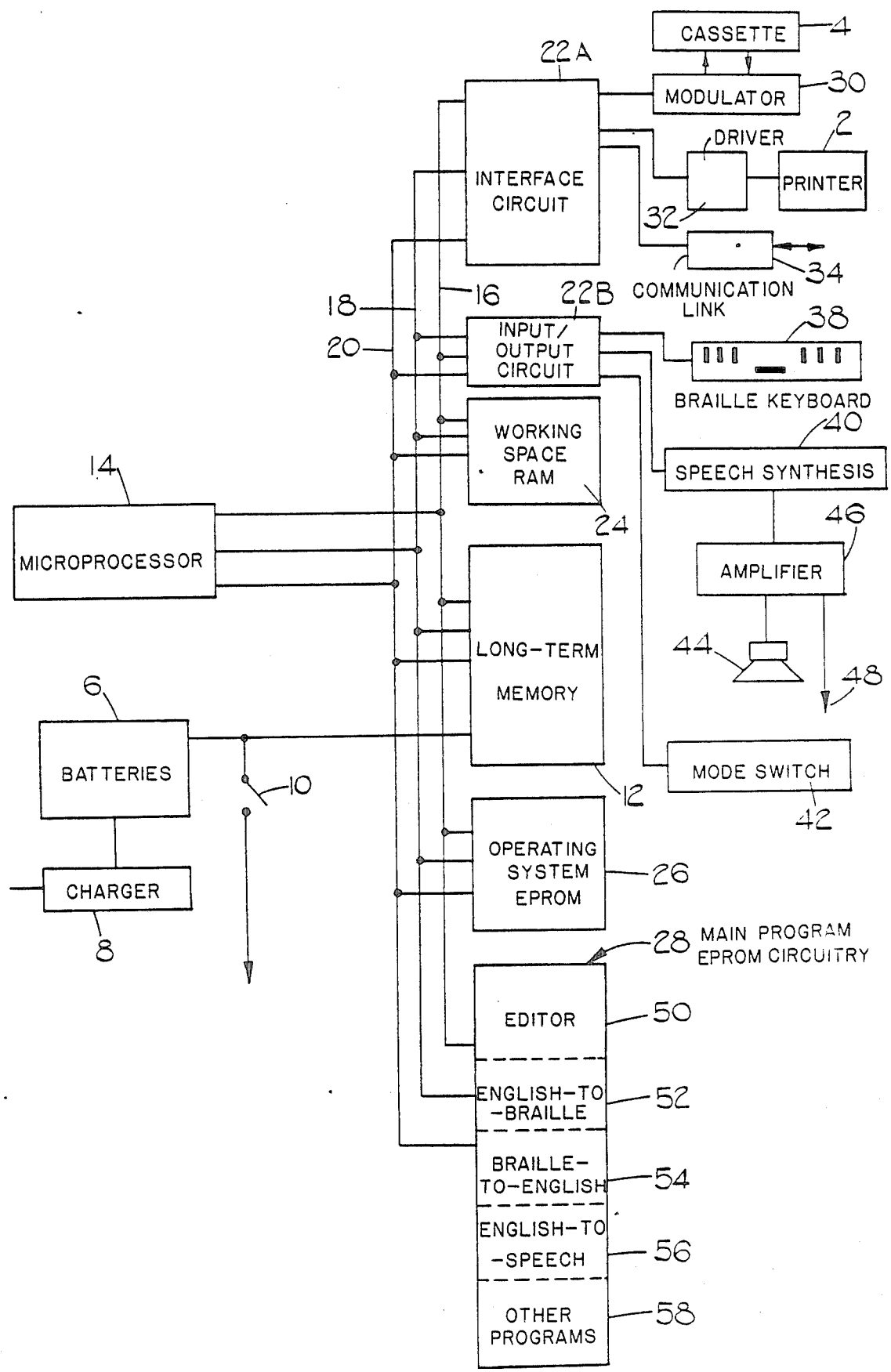

4,694,494

ELECTRONIC MEMORY DEVICES FOR THE BLIND

BACKGROUND OF THE INVENTION

This invention relates to electronic memory devices for the blind or persons having impaired vision, and is more particularly concerned with devices of the type having a Braille keyboard enabling the user to enter information into the device in the form of grade 1 and/or grade 2 Braille.

A known electronic note-taking device for use by blind persons or persons having impaired vision comprises a Braille keyboard having seven keys by means of which any of the 64 Braille symbols may be used to enter words in uncontracted form (grade 1) or contracted form (grade 2) into a memory, and a tactile feedback mechanism enabling the user to read or edit what is stored. This device may incorporate a cassette unit for storing large volumes of data, and may be linked to a computer or a Braille embosser. However, such a device is extremely costly, more particularly on account of the high cost of the tactile feedback mechanism, as well as being bulky and relatively inflexible in use. Thus, for example, it is not possible to directly feed data in the form of grade 2 Braille stored within the device to an English printer to obtain a print-out in English.

It is an object of the invention to provide an electronic memory device for a blind person which can be produced at low cost and is easy to use.

SUMMARY OF THE INVENTION

According to the invention there is provided an electronic memory device for a blind person or person having impaired vision, the device comprising a Braille keyboard, a memory connected to the keyboard for storing text entered on the keyboard, a text editor controllable by way of the keyboard to edit text entered on the keyboard, and a speech synthesizer for outputting speech in response to receipt of codes indicative of text entered on the keyboard whereby that text may be interactively edited by the user by means of the text editor in response to the speech output.

Such a memory device may be used by a blind person as a note taker and is particularly convenient in use as it enables the user to enter words and sentences into the device in Braille form and then to obtain playback in the form of synthesized speech of the text entered into the device without having to remove his hands from the keyboard. Further the user may make use of the text editor to edit the text entered into the device in response to the speech output of the speech synthesizer.

The device may include playback means under control of the keyboard for causing the speech synthesizer to produce a speech output corresponding to text stored in the memory. Preferably the playback means is capable of selecting only a part of the text stored in the memory for playback by the speech synthesizer, and is also capable of causing the speech synthesizer to playback a single character within a word.

The text editor may include means controllable from the keyboard so as to point to different parts of the text stored in the memory for editing purposes, as well as means controllable from the keyboard for insertions into or deletions from the part of the text stored in the memory indicated by the pointing means. The device may also include means controllable from the keyboard for inserting markers in the text entered into the memory, and means enabling the markers in the text to be rapidly accessed subsequently.

Preferably the device includes a phoneme generator for generating phoneme codes corresponding to text and other information entered on the keyboard and for driving the speech synthesizer. However, as an alternative, the device may include an allophone generator for generating allophones corresponding to text and other information entered on the keyboard and for driving the speech synthesizer.

In a preferred embodiment of the invention the device incorporates a translator for translating Braille coded text or other information entered into the device into sighted language coded information, this translator advantageously being adapted to translate text or other information entered into the device in either grade 1 Braille or grade 2 Braille form, at the option of the user, into sighted language coded information. The use of grade 2 Braille is highly advantageous as it enables a skilled grade 2 Braille user to enter information into the device at high speed. In either case the phoneme generator may be adapted to translate the sighted language coded information into phoneme or allophone codes for driving the speech synthesizer.

In order to enable a permanent copy of information entered into the device to be obtained which can be read by sighted persons, the device may include an interface for outputting sighted language coded information to drive a printer. In addition the device may include an interface for outputting Braille coded information to drive an embosser in order to provide a permanent copy of information entered in the device which can be read by a person familiar with Braille notation.

Furthermore the device may include an interface enabling Braille coded and/or sighted language coded information to be received from or outputted to a bulk storage unit, such as a cassette or disc unit, and optionally also an interface enabling each-way transfer of information between the device and a further device provided with a similar interface. The latter may comprise conventional serial communication input/output units. It may also be found advantageous to incorporate in the device a cassette unit and/or a sighted language printer.

In a further development of the invention the device may include a translator for translating sighted language coded information into Braille coded information, preferably in grade 2 form, so as to enable sighted language text received from another device to be stored in the first mentioned device in Braille form and subsequently outputted to a Braille embosser if required.

BRIEF DESCRIPTION OF THE DRAWING

In order that the invention may be more fully understood, a preferred embodiment of the invention will now be described, by way of example, with reference to the accompanying drawing, in which the single FIGURE is a block diagram of the device.

DETAILED DESCRIPTION OF THE DRAWING

The illustrated device is an electronic note-taking device for use by the blind or persons having impaired vision and incorporates an integral printer 2 for providing a print-out in English and an integral cassette unit 4 for long-term storage. The device is portable and is designed to run off batteries 6 which may be recharged from the mains by means of a charger 8. To minimise the power consumption and hence the size of the batteries 6, CMOS integrated circuitry is used wherever possible in the construction of the device. An on/off switch 10 is provided to supply power on switch on to all the circuits of the device, with the exception of a long-term memory 12 which is permanently supplied with power from the batteries 6 and which will be described in more detail below.

The device is based on a NSC800 microprocessor 14 which is connected to a data bus 16 (8 wires), an address bus 18 (up to 16 wires) and a control bus 20. Also connected to the data, address and control buses 16, 18 and 20 are an NSC810 RIOT (RAM, Input, Output, Timer) interface circuit 22A, an NSC831 input/output circuit 22B, working space RAM 24, the long-term memory 12, an operating system EPROM 26 and main programme EPROM circuitry 28. The interface circuit 22A comprises working space RAM and input, output and timing circuitry, and interfaces with the cassette unit 4 by means of a modulator 30 and with the printer 2 by means of a driver 32. In addition the circuit 22A is connected to an RS232 serial communication link 34 for each-way communication with a further device. The circuit 22B interfaces with a Braille keyboard 38, a speech synthesizer circuit 40 and a mode switch 42. The speech synthesizer circuit 40 is connected to a loudspeaker 44 by way of filter and amplifier circuitry 46 and is also connected to an earphone socket 48 to allow private listening by way of an earphone. The mode switch is used, in combination with the keys of the Braille keyboard 38, to determine the mode of operation of the device, for example to transfer text from memory to cassette and vice versa, to output to the printer or a Braille embosser or to communicate with other devices.

The long term memory 12 is an 8K or 10K CMOS RAM and is used for long term storage of data in Braille coded form. Since the memory 12 is powered from the batteries 6 even when the device is switched off, data is permanently maintained in the memory 12 until erased. When the batteries 6 are recharged or switched off for any other reason, the memory 12 is powered by an auxiliary battery (not shown). The operating system EPROM 26 incorporates the operating system programme which is written in Z80 machine code language and controls all communication to and from the peripherals, that is the cassette unit 4, the printer 2, the keyboard 38, the synthesizer 40, and the mode switch 42. The main programme EPROM circuitry 28 incorporates the main group of programmes which include an editor 50, an English-to-Braille translator 52, a Braille-to-English translator 54, an English-to-speech translator 56 and other programmes 58.

When the device is switched on, the microprocessor 14 runs under control of the operating system EPROM 26 which effectively looks at the mode switch to see if any special programmes are required. This will be described more fully below. If no special programmes are selected, it is assumed that Braille coded information is to be entered from the keyboard 38 into the next free location in the long-term memory 12 by way of the interface circuit 22B. In use information entered into the device or warning messages may be outputted to the speech synthesizer 40 by way of the interface circuit 22B. Phoneme codes are generated in the English-to-speech translator 56 from the appropriate English codes stored in the working space RAM 24 and these are sent one by one to the speech synthesizer 40 under control of the operating system EPROM 26 until a complete 'word' has been outputted by the speech synthesizer 40. Signals from the speech synthesizer 40 are sent back to the microprocessor 14 to indicate that a sound has been made and that the synthesizer 40 is ready for the next set of phoneme codes.

Data inputted into the device from the keyboard 38, the switch 42, the cassette unit 4 or the serial communication link 34 is stored temporarily in the RAM 24 for use by the main programme EPROM circuitry 28. Similarly data from the main programme EPROM circuitry 28 is stored temporarily in the RAM 24 ready for the operating system EPROM 26 to retrieve it and send it to the speech synthesizer 40, the cassette unit 4, the printer 2 or the serial communication link 36.

The above described device is particularly flexible in operation and can be used by a blind person or person having impaired vision for a variety of purposes. Text may be entered into the device from the Braille keyboard 38 either in contracted (grade 2) or uncontracted (grade 1) form, and the text is stored in the long-term memory 12 in the form of grade 1 or 2 Braille codes. The stored text may be converted into the English codes and passed to the on-board printer 2 to produce a permanent copy in standard English characters on paper. Furthermore the English codes may be converted into phoneme codes to provide a spoken output in standard English from the speech synthesizer 40. By listening to the speech outputted by the synthesizer 40, the user may edit the text using the built-in text editor 50. The user can store text from the memory 12 on to cassette tape in the same form as it is stored in the memory 12. Furthermore the device may both send and receive data, and may drive an external printer or Braille embosser, or access a computer, without an additional intermediate device. Finally text may be received from another device, computer or other communication device in the appropriate English coded form or in the form of grade 1 or 2 Braille codes. If the text is in English coded form, it may be translated into grade 1 or 2 Braille and stored, and, if it is in grade 1 Braille coded form, it may be translated into grade 2 Braille and stored. The stored text may be outputted to a Braille embosser if desired.

When the device is first switched on, a warning message is outputted by the speech synthesizer 40 in the form "Enter text.XXX free space available". The user may then enter text by way of the keyboard 38, with the new text being appended to text already in the memory 12, until, shortly before the memory 12 is full, a warning message is outputted by the speech synthesizer 40 in the form "XXX free space available".

The user may perform various operations on the entered text by operating a special function key provided on the Braille keyboard 38. Operation of this key is indicated below by "Fn." and typing of a Braille letter on the keyboard is denoted simply by the corresponding capital letter of the alphabet. In this manner the user may not only enter the required text into the memory 12 and cause the stored text to be printed by the printer 2 or recorded by the cassette 4, but may also edit the text either during entry or subsequently after the whole text has been entered. Clearly such editing requires interactive feedback between the user and the device using the keyboard 38 and the speech synthesizer 40, with the speech synthesizer speaking the test to be edited and providing suitable prompts and acknowledgments where necessary. In addition the user may place up to 64 markers in the stored text when entering the text to enable those parts of the text to be rapidly accessed.

Set out below are the various operations which may be performed and the manner in which these are initiated by typing on the Braille keyboard 38, each command to the system being acknowledged by an appropriate output from the speech synthesizer 40.

Enter marker:
Fn. J - then enter marker name following by a space.
Speak word:
Fn. B - speaks last word.
Fn. F - speaks next word.
Speak general:
Fn. T - sets talk mode. Then type one of following letters:
A - speaks all of text.
F - speaks from current position to end of text.
M - enter marker name followed by a space.
 - speaks from current position to marker or to end of text if no marker found.
dot4 - speaks next character. Repeat dot4 for another.
dot5 - speaks next word. Repeat dot5 for another.
Internal Printer:
Fn. P - sets internal print mode. Then type one of the following letters:
A - prints all of text.
F - prints from current position to end of text.
m - enter marker name followed by a space.
 - prints from current position to marker or to end of text if no marker found.
Cassette Recorder:
Fn. S - sets record mode. Then type one of the following letters:
A - saves all of text.
F - saves from current position to end of text.
Fn. L - sets playback mode. Loads data from cassette at current position.
Output:
Fn. X - sets to data transfer mode.
 Then type one of the following letters:
B - sets routine for embossing ⎫ Then type one
 ⎬ of the fol-
P - sets routine for printing ⎭ lowing letters:
A - outputs all.
F - outputs from current position to end of text.
M - enter marker name followed by a space
 - outputs from current position to marker or end of text if no marker found.
I - sets routine for input.
Clear memory:
Fn. C - speaks "Clear?". Then type Fn. C to clear memory, or any other character to return to normal mode.
Move pointer
(your position in text):
Fn. dot1 - back one character.
Fn. dot2 - back one word.
Fn. dot3 - back one sentence.
Fn. dot4 - forward one character.
Fn. dot5 - forward one word.
. Fn. dot6 - forward one sentence.
(Note no speech with above 6 functions)
Fn. B - back one word and speaks it.
Fn. F - forward one word and speaks it.
Insert text:
(First move pointer to entry point in text then)
Fn. I - sets routine for insertion. Then enter text as required.
Fn. E - terminates insert.
Delete text:
(First move pointer to start of block to be deleted then)
Fn. D - sets routine for deletion. Then move pointer forward with move commands as above.
Fn. E - ends delete having removed text from first position to last position.
or Fn. R - removes previous word wherever you are in text.
Query memory free:

-continued

Fn. M - announces free memory.

All print output is lower case unless the device is otherwise instructed. Thus typing dot6 causes the following letter to be printed in upper case, and typing dot6, dot6 causes the whole word following to be printed in upper case. Typing of dot456, dot456 causes every word following to be printed in upper case until terminated by typing dot456, dot456 in front of the last word required in capitals. A newline in Braille embossing and print is caused by typing the character 'AR' (dot345) separated from all other characters. Otherwise newlines will automatically be generated to avoid the splitting of words. A new paragraph in Braille embossing and print can be produced only by typing 'AR' immediately followed by another 'AR'. This double character must be separated from all other characters.

It will be appreciated that this device enables text to be entered into the device in grade 1 or 2 Braille form, and English text to be outputted to the printer 2 or speech synthesizer 40. This is made possible by the Braille-to-English translator 54 which incorporates a table of about 260 Braille contractions with their English equivalents and with a code for each contraction expression context. Thus "ble" would appear in the table with its Braille equivalent and say the code 3 indicating that "ble" is a correct translation only when the Braille character does not start a Braille word. In addition the translator 54 includes a further table which serves as an index to the main table. The translation programme looks at the current position in the string being translated, generates an index corresponding to the correct character and, via the index table, goes to the first entry in the main table which starts with the correct character. The main table is then indexed until a string match is found.

The above described device is designed to be operated in English Braille. However, similar devices may be used with both other variants of Braille and other sighted languages. The speech synthesizer in the above described device may be replaced by an arrangement for outputting prerecorded speech stored in coded form or by some other form of speech generator.

I claim:

1. An electronic memory device for a blind person or person having impaired vision, said device comprising: a Braille keyboard having a respective key for inputting each dot of a Braille character; memory means for storing in coded form text which has been entered on the keyboard in Braille notation; text transfer means for transferring text from the keyboard to the memory means; text editing means controllable by way of the keyboard to enable text which has been entered on the keyboard and stored in the memory means to be edited by searching for a specified portion of text, by deleting characters from the text and by inserting characters into the text and to enable the edited text to be restored in the memory means; a speech synthesizer for outputting speech in response to receipt of speech codes, and speech control means controllable by way of the keyboard for translating text from the memory means into speech codes and supplying said speech codes to the speech synthesizer, whereby text which has been entered on the keyboard and stored in the memory means may be interactively edited by a user by means of the text editing means in response to reproduction by the speech synthesizer of the text selected for editing by the text editing means.

2. A device according to claim 1, wherein the speech control means is controllable to effect reproduction of a single character within a word by the speech synthesizer.

3. A device according to claim 1, further comprising means controllable by way of the keyboard for inserting markers in the text entered into the memory means and means enabling the markers to be subsequently and rapidly accessed.

4. A device according to claim 1, including a translator for translating Braille coded text or other information entered into the device into sighted language coded information.

5. A device according to claim 4, wherein the translator is adapted to translate text or other information entered into the device in either grade 1 or grade 2 Braille form, at the option of the user, into sighted language coded information.

6. A device according to claim 1, including a printer interface for outputting sighted language coded information to drive a printer.

7. A device according to claim 6, including a printer connected to the printer interface.

8. A device according to claim 1, including a Braille interface for outputting Braille coded information to drive a Braille embosser.

9. A device according to claim 8, including a Braille embosser connected to the Braille interface.

10. A device according to claim 1, including a record interface enabling Braille coded and/or sighted language coded information to be received from or outputted to a cassette or disc unit.

11. A device according to claim 10, including a cassette or disc unit connected to the record interface.

12. A device according to claim 1, including a communication interface enabling each-way transfer of information between the device and a further device provided with a similar interface.

* * * * *